United States Patent [19]

Friedman et al.

[11] Patent Number: 4,842,072
[45] Date of Patent: Jun. 27, 1989

[54] SAND CONSOLIDATION METHODS

[75] Inventors: Robert H. Friedman; Billy W. Surles, both of Houston, Tex.

[73] Assignee: Texaco Inc., White Plains, N.Y.

[21] Appl. No.: 223,822

[22] Filed: Jul. 25, 1988

[51] Int. Cl.4 .......................................... E21B 33/138
[52] U.S. Cl. .................................. 166/295; 166/300; 523/131
[58] Field of Search ............... 166/295, 300; 523/130, 523/131

[56] References Cited

U.S. PATENT DOCUMENTS

| | | | |
|---|---|---|---|
| 4,042,032 | 8/1977 | Anderson et al. | 166/295 X |
| 4,427,069 | 1/1984 | Friedman | 166/295 |
| 4,669,543 | 6/1987 | Young | 166/295 X |

Primary Examiner—George A. Suchfield
Attorney, Agent, or Firm—Jack H. Park; Kenneth R. Priem

[57] ABSTRACT

Methods are provided for selectively consolidating naturally occurring mineral grains such as sand within a subterranean formation to form a fluid permeable barrier which restrains the movement of sand particles when oil passes through the barrier. A fluid comprising a polymerizable resin such as an oligomer of furfuryl alcohol and as a diluent, a polar organic solvent such as butylacetate and an oil soluble, slightly water-soluble acid catalyst such as orthonitrobenzoic acid is provided and injected into the formation to be consolidated. Water which is at least 70% saturated with respect to sodium chloride or other effective inorganic salt is then injected into the resin fluid saturated formation to open flow paths within the portion of the formation invaded by the polymerizable resin fluid. The well is shut in for sufficient period of time for polymerization to convert the injected fluids into a permeable barrier around the wellbore.

20 Claims, No Drawings

SAND CONSOLIDATION METHODS

REFERENCE TO COPENDING APPLICATIONS

This application is related to pending application Ser. No. 07/135162 filed Dec. 18, 1987, now U.S. Pat. No. 4,800,960 for Gravel Pack Method.

FIELD OF THE INVENTION

This invention concerns a method for treating wells completed in subterranean formations containing unconsolidated particulate matter, e.g. unconsolidated sand, in order to bind the unconsolidated sand grains together in the portions of the formation immediately adjacent to the perforations of the well, in order to form a stable yet still fluid permeable barrier around the wellbore, in order to facilitate production of fluids from the formation while restraining the movement of sand into the wellbore during the fluid production phase. More particularly, this invention pertains to a method for accomplishing sand consolidation in producing oil wells utilizing the sand naturally present in the formation and a method which utilizes a substantially reduced number of procedural steps, which reduces the time and cost of treating wells. Still more particularly, this invention comprises a method for selectively consolidating sand grains together in the formation adjacent to the inlet of a producing wellbore by use of single fluid containing the polymerizable resins with the catalyst already mixed with the resin in order to achieve more uniform mixing and to reduce the necessity of first cleaning the sand grains, followed by contacting the sand with sufficient catalyst containing fluid to deposit catalyst on the sand grain surface, followed by injecting the polymerizable resin as is taught in other prior art methods.

BACKGROUND OF THE INVENTION

Sand consolidation is a well known term applying to procedures routinely practiced in the commercial production of petroleum, whereby wells are treated in order to reduce a problem generally referred to as unconsolidated sand production. When wells are completed in petroleum-containing formations, which formations also contain unconsolidated granular mineral material such as sand or gravel, production of fluids from the formation causes the flow of the particulate matter into the wellbore, which often leads to any of several difficult and expensive problems. Sometimes a well will "sand up", meaning the lower portion of the production well becomes filled with sand, after which further production of fluid from the formation becomes difficult or impossible. In other instances, sand production along with the fluid results in passage of granular mineral material into the pump and associated hardware of the producing well, which causes accelerated wear of the mechanical components of the producing oil well. Sustained production of sand sometimes forms a cavity in the formation which collapses and destroys the well. All of these problems are known to exist and many methods have been disclosed in the prior art and applied in oil fields in order to reduce or eliminate production of unconsolidated sand from a petroleum formation during the course of oil production.

The above-described problem and potential solutions to the problem have been the subject of extensive research by the petroleum industry in the hope of developing techniques which minimize or eliminate the production of sand particles into the producing well and associated equipment during the course of producing fluids from the formation. One such general approach suggested in the prior art involves consolidating the porous sand structure around the wellbore in order to cement the loose sand grains together, thereby forming a permeable mass which will allow production of fluids but which will restrain the movement of sand particles into the wellbore. The objective of such procedures is to create a permeable barrier or sieve adjacent to the perforations or other openings in the well casing which establish communication between the production formation and the production tubing, which restrains the flow of loose particulate mineral matter such as sand. Another approach involves removing a portion of the formation around the well and packing specially prepared granular material into the formation around the wellbore which is subsequently caused to be cemented together.

Consolidation only needs to extend into the formation to a depth of 6 to 12 inches around the periphery of the perforations or other openings in the outer casing of the production well.

It is a primary objective of any operable sand consolidation method that a barrier be formed around the wellbore which restrains the movement of sand particles into the well while offering little or no restriction to the flow of fluids, particularly oil, from the formation into the wellbore where it can be pumped to the surface of the earth.

Another very important quality of a satisfactory sand consolidation method is durability of the permeable barrier formed around the wellbore. Once the barrier is formed and the well is placed on production, there will be a substantial continuing flow of fluids through the flow channels within the permeable barrier, and it is important that the barrier last for a significant period of time, e.g. several months and preferably years, without excessive abrasive wear or other deterioration of the consolidation matrix which would cause the particulate matter to once again flow into the wellbore. This is a particularly difficult objective to accomplish in the instance of sand consolidation procedures applied to wells being utilized in formations subjected to steam flooding or other thermal recovery methods. The production of fluids in steam flooding operations involve higher temperatures and higher pH fluids than are normally encountered in ordinary primary production, and this greatly aggravates the stability problem of sand consolidation procedures.

It is also important of course that the material injected into the formation should be essentially unreactive during the period it is inside the wellbore, i.e. while it is being pumped down the well and positioned where it is desired adjacent to the perforations of the production casing. It is this desire to delay the consolidation reaction that has lead to multi-step procedures in which first a catalyst is injected into the formation, after which the polymerizable resin containing fluid is injected. While this reduces the propensity for the fluid to polymerize in the wellbore, it does give rise to several problems which constitute inherent weaknesses in many prior art methods for accomplishing sand consolidation. First, each separate injection step increases the time and cost associated with the well treatment by which sand consolidation is accomplished. Second, injection of catalyst into the formation in advance of the polymerizable fluid does not accomplish uniform mixing of catalyst with all of the polymerizable fluid which is needed to ensure optimum polymerization of the resin, which is essential for strength and durability of the consolidated mass. Use of aqueous fluids to inject catalyst often gives rise to the need for yet additional steps to clean the sand to remove formation petroleum so the catalyst will be absorbed by the sand and later mix with the subsequently injected resin containing fluid.

Many materials have been utilized for consolidating sand in the formation adjacent to production of wellbores. One of the more successful agents utilized for this purpose is furfuryl alcohol resin which can be polymerized to form a solid matrix which binds the sand grains together, while at the same time offering superior resistance to high temperatures and to caustic substances which may be encountered in steam flood operations. One of the problems in utilizing furfuryl alcohol resin to polymerize in the formation for the purpose of consolidating sand grains is in accomplishing uniform catalysis of the polymerization. Many catalysts that are effective for polymerizing furfuryl alcohol resins cannot be admixed with the furfuryl alcohol to permit a single fluid containing both the resin and the catalyst to be injected into the formation, because the time of polymerization is so short or unpredictable that there is excessive danger that the resin will polymerize in the injection wellbore. In my U.S. Pat. No. 4,427,069 there is disclosed a procedure for consolidating sand in a formation adjacent to a wellbore using an oligomer of furfuryl alcohol, in which the catalyst used is a water soluble acidic salt, preferably zirconyl chloride, which is injected in an aqueous solution into the formation prior to the resin containing fluid injection. The salt absorbs on the sand grains, and sufficient acidic salt remains adsorbed on the sand grain during the subsequent resin fluid injection stage that adequate polymerization occurs. Although this has been very effective in most difficult situations where sand consolidation procedures are utilized, specifically in connection with thermal flooding such as steam injection procedures, the procedure nevertheless requires a multi-fluid injection procedure which requires more time and is more expensive than is desired. Usually a preliminary sand cleaning step is required before injecting the aqueous-catalyst solution in order to remove the naturally-occurring oil film from the sand grains to ensure good catalyst adsorption on the sand. Also, although catalyst mixes with the subsequently injected polymer to a limited degree, usually sufficient to cause polymerization, it is believed that superior performance would result if the catalyst resin mixture can be made more homogenous prior to polymerization, in order to achieve a dense strong durable consolidation mass.

In U.S. Pat. No. 4,669,543 which issued June 2, 1987, there is described a method for consolidating sand using an acid curable resin and utilizing as a catalyst, the reaction product of an acid, and an alkyl metal or ammonia molybdate. In that instance, the catalyst is incorporated in an aqueous carrier fluid which comprises the continuous phase of an emulsion in which the polymerizable resin is the dispersed or discontinuous phase. Thus this process requires that the emulsion be resolved or broken after it is located in the portion of the formation where the permeable consolidating mass is desired, which is difficult to achieve to the degree of completion necessary to accomplish the desired strong durable consolidating matrix necessary for a long lasting sand consolidation process.

In view of the foregoing review of the current state of the art, it can be appreciated that there is still a substantial unfulfilled need for a sand consolidation process employing a polymerizable resin in which complete mixing between the catalyst and the resin is accomplished prior to the polymerization reaction, in order to ensure that the polymerization reaction proceeds to completion, thus ensuring that the resultant polymer matrix posses the maximum possible strength and durability. There is also a need for a sand consolidation process in which the number of separate fluid injection stages is reduced to a minimum of one or two fluid injection steps, in order to reduce the time and cost of the sand consolidation method.

SUMMARY OF THE INVENTION

We have discovered methods for consolidating sand involving the use of a polymerizable resin, preferably a derivative of furfuryl alcohol, and an oil soluble internal catalyst which can safely be mixed with the resin on the surface, so a fluid containing both catalyst and the resin is injected into the unconsolidated sand. The catalyst action is sufficiently slow at ordinary surface ambient temperatures but there is no danger of premature reaction of the resin resulting in plugging of the surface mixing equipment or the injection string utilized for pumping the resin material down the well into the formation. The catalyst activity is highly dependent on temperature, and at formation temperatures as low as 140° F., with catalyst incorporated in the resin-containing fluid, polymerization of the resin will occur in a reasonable period of time. The preferred embodiment involves preparation of a mixture of from 0.5 to 3 and preferably about 1% nitrobenezoic acid, the preferred catalyst for this reaction, and from 40 to 70%, and ideally around 59% of a polar organic diluent. Our preferred organic diluent is butylacetate. To this mixture of butylacetate and nitrobenzoic acid is added from 20 to 60 and preferably about 40% resin, e.g. the furfuryl alcohol oligomer. This homogeneous organic fluid can then be injected via the injection string into the formation without danger of premature polymerization. The injected mixture of resin, butylacetate and nitrobenzoic acid, being oil soluble, simultaneously removes and displaces undesired oil and other material coating the sand grains, and accomplishes a thorough coating of the sand grains with the resin catalyst mixture. Next, an aqueous saline solution which is from 70% to 100% saturated with inorganic salt, preferably sodium chloride, is injected into the resin saturated zone of the formation. This injection step accomplishes an opening of flow channels within the void spaces in the formation into which the resin catalyst mixture had been injected without removing the polymerizable resin, an event which would occur with >70% salt solution, which is important to ensure that the resulting polymerized resin bonded sand matrix is sufficiently permeable to permit flow of formation fluids from the formation after the sand consolidation process is completed. The salt water also modifies the resin coating on the sand, removing water therefrom, which increases the strength and durability of the polymerized resin matrix. The well is then shut in for a period of from 1 to 10 days and preferably at least one week. The preferred shut-in period is a function of the formation temperature. This two-step procedure results in the formation of a permeable, durable, consolidated sand mass around the perforations of the wellbore which restrains the movement of sand into the wellbore during production operations, while permitting relatively free flow of formation fluids, particularly formation petroleum, into the wellbore. The thickness of the permeable mass formed around the perforations of the production well casing is determined by the volume of the fluid comprising the polymerizing resin and catalyst injected into the formation. Ordinarily it is sufficient for our purposes if the volume of polymerized sand is at least six inches in thickness measured from the production well perforations. If the thickness exceeds twelve inches, the barrier is still effective but is unnecessarily expensive and flow restricting. This procedure results in a permeable mass which is stronger than previous techniques because the catalyst is more completely dispersed and mixed in the resin prior to polymerization than is possible by injecting a fluid containing the catalyst either before or after the polymer injection phase, and because the salt water injected after the polymer causes water to be removed from the polymer forming matrix. The procedure also requires less time to accomplish in the field and is less expensive, because the number of separate injection steps is reduced over other prior art methods.

DETAILED DESCRIPTION OF THE PREFERRED EMBODIMENTS

We have discovered, and this constitutes our invention that it is possible to accomplish an improved sand consolidation method utilizing the sand naturally occurring in the formation in a process employing a single fluid injection step in which a mixture of polymerizable resin, having dissolved or dispersed therein the catalyst for the polymerization step, and a organic polar diluent, is injected into the formation to saturate the void space in the portion of the formation adjacent to the production well. This accomplishes coating the formation granular material, e.g. the formation sand, with the mixture of polymerizable resin and catalyst. Since the fluid injected into the formation in this step is organic and contains a diluent, the minor amounts of formation petroleum and other oil based materials coating and contaminating the surface of the sand grains is effectively removed or dissolved. It is a particular feature of this method that a preliminary wash step to remove materials coating the sand grains is not required. We have conducted laboratory tests, using formation sand containing crude oil, to which additional oil was deliberately added, and we still obtained successful consolidation by this method without any preliminary wash step.

The resin which we have found to be especially preferable for use in our sand consolidation reaction is a furfuryl alcohol oligomer. Any resin which will polymerize upon exposure to heat and contact with an acid catalyst can be used in this process; however, furfuryl alcohol oligomer $(C_4H_3OCH_2O)_n$ is the particularly preferred polymerizable resin. This resin has the advantage of being relatively inexpensive and having the characteristic of autopolymerizing on exposure to acid catalyst, forming a thermal setting resin which cures to an insoluble mass that is highly resistant to chemical attack as well as to thermal degradation. The particularly preferred commercial form in which this resin is available is Quacorr 1300 marketed by QO Chemicals. This resin is ordinarily obtained commercially in a form containing 90 to 95 percent furfuryl alcohol oligomer.

The furfuryl alcohol oligomer emulsion utilized in our process is so viscous that it must be diluted with an appropriate solvent in order to permit it to be pumped into the formation, and to accomplish relatively complete filling of void spaces in the formation between the sand grains. Any solvent for the furfuryl alcohol oligomer would accomplish this objective. It is possible, however, to accomplish this and another more important objective by using as the diluent a hydrolyzable ester. The polymerization of the furfuryl alcohol oligomer produces water and the water produced by polymerization suppresses the polymerization reaction. If water produced during polymerization of furfuryl alcohol oligomer can be removed, it is possible to force the polymerization reaction to proceed further toward completion and thereby produce longer polymer chains than would result if water were left in the polymer reaction mass. A hydrolyzable ester will remove water as it is produced, leading to the formation of longer chain polymers which result in a stronger, more durable polymer matrix which binds the sand grains together. Accordingly, our preferred diluent for the furfuryl alcohol oligomer is a hydrolyzable ester, and our especially preferred species is butyl acetate.

It is essential for this procedure that the acid catalyst utilized be oil soluble so that it may be incorporated in the resin solvent solution. This permits thorough mixing of the catalyst which is essential in or order to ensure that the polymerization reaction occurs uniformly throughout the entire mass of sand consolidation chemical placed in the formation. Prior art methods which utilize a catalyst injected in a non-miscible fluid either before or after injection of the fluid containing the polymerizable resin, or present in a non-miscible phase of the polymer fluid, do not accomplish uniform reactions such as are possible by use of the present soluble catalyst. The catalyst for use in our invention must also be one which exhibits temperature sensitivity such that the catalytic polymerization does not occur during the time that the fluid is prepared and mixed on the surface of the earth or pumped into the formation. It is equally important that once the fluid is placed in the formation and left in a quiescent state for a period of time sufficient to ensure temperature equalization with the formation, that the polymerization reaction occur rapidly in order to permit completion of the procedure in an relatively brief period of time, so the well can be put on production as soon as possible. Because of this dual requirement, the catalyst choice is very critical to the proper function of our invention.

As stated above, the preferred catalyst for use in our process is one which is oil soluble and very slightly water soluble. The preferred organic acid catalyst is orthonitrobenzoic acid. This may be used in a concentration from 0.05 to 5.0 and preferably from 1.0 to 4.0 percent by weight of the catalyst based on the total weight of solution of resin, diluent and catalyst.

One preferred method for forming a particularly effective fluid for us in practicing the process of our invention involves mixing an approximately 50-50 mixture of the resin in its commercial form, which is usually an emulsion, with butylacetate, after which the nitrobenzoic acid catalyst is dissolved in this mixture of resin and ester.

The quantity of the fluid comprising the resin, diluent and catalyst injected into the formation varies depending on the thickness and porosity of the formation to which the sand consolidation process is to be applied, as well as the diameter of the well and the desired thickness of the permeable barrier in the formation. The thickness and porosity of the formation and the diameter of the well will always be known, and it is ordinarily satisfactory if depth of the penetration is in the range of from 6 to 12 inches from the well bore. As an example, if it is desired to treat a formation whose thickness is 18 feet and porosity is 35% to form a permeable barrier just outside the perforations of the wellbore which is 8 inches thick, and the well being treated is 10 inches in diameter, then the volume of fluid necessary is calculated according to the example below.

Volume in cubic feet equal $$\frac{\pi\left(\frac{10}{2}+8\right)^2 - \pi\left(\frac{10}{2}\right)^2}{144} \times H \times \text{Porosity} =$$

$$\frac{3.14(13)^2 - 3.14(5)^2}{144} \times 18 \times (.35)$$

19.79 cubic feet = 148 gallons of the fluid comprising resin, catalyst and diluent.

After the above described quantity of fluid comprising resin, catalyst and diluent are injected into the formation, a second step is needed to accomplish several objectives. The polymerizable resin must be displaced from the injection string to avoid the possibility that the resin might polymerize in the wellbore. Second, the fluid injected into the formation occupies essentially all of the void space of the formation, e.g. the volume other than the sand grains themselves in the portion of the formation contacted by the fluid. If this injected fluid polymerized without injecting any second fluid to displace a portion of the resin material from the void spaces of the formation, the resultant barrier would be strong and resistant to chemical attack but it would not be sufficiently permeable to permit flow of fluid through the formation into the wellbore. Also, the polymerizable resin used to prepare the sand consolidation matrix is normally available commercially as a mixture containing about 5 percent water. The strength of the sand consolidating polymer matrix will be increased if at least a portion of this water is removed before the resin polymerizes.

We have found that the desired objective of displacing resin from the injection string and developing permeability within the sand consolidated mass and dewatering the polymer-containing fluid is best accomplished by injecting brine or water containing an inorganic salt, preferably sodium chloride, into the string to displace the residual amount of resin fluid from the injection string, and also to pass through the portion of the of the formation occupied by the resin fluid. Injection of the brine develops permeability within the treated portion of the formation which ensures that after the resin has polymerized, the resultant barrier will be permeable to the flow of fluids. The salinity of water utilized in this procedure is quite important. The surface of the resin coated sand grains should be dewatered in order to aid in the polymerization reaction and also in order to produce a more dense strong matrix cementing the sand grains together. Fresh water or water containing up to 70 percent salt does not accomplish the drying action necessary to produce the desired strength in the permeable barrier. The desired results will only be achieved if the second fluid injected into the formation is at least 70% saturated with respect to the inorganic salt and preferably 80% saturated. Our particular preferred embodiment uses essentially saturated brine, specifically water saturated with sodium chloride at the conditions of injection. By using at least 70% saturated brine, the desired development of permeability is achieved without displacing any of the resin from the sand grains and dehydration of the resin necessary for the polymerization reaction to occur in the time and to the extent desired for optimum polymerization is also realized.

As a practical matter, the brine utilized will probably be water containing mainly sodium chloride because of the cost and availability of sodium chloride in the field. This is a particularly preferred brine for our purpose. We have discovered that potassium chloride does not work well in this application, and so the fluid injected into the formation after the polymerization fluid has been injected should not contain appreciable quantities of potassium chloride. The quantity of brine injected into the formation should be sufficient to displace all of the residual resin fluid from the injection string, and also sufficient to pass through the resin saturated portion of the formation. It is generally sufficient if about the same volume of brine as the polymerization fluid is utilized, and the rate at which it is injected is not particularly critical for our purposes.

After the above steps of injecting the polymerization fluid and the sodium chloride solution or brine are completed, the well should be shut in and left to stand for a period of from 1 to 10 and preferably from 2 to 9 days. The time required for the polymerization reaction to proceed to completion is a function of temperature, and lower soak times are required at higher temperatures. For example, up to 10 days may be required if the formation temperature is about 200° F. whereas complete polymerization will be achieved in five days if the formation temperature is as high as 300° F.

There are situations different from these described above when it is desirable to form a strong, impermeable barrier around a wellbore, such as when excessive water flow is mixing with oil produced from an adjacent layer, or when steam override at the producing well in a steam drive project is encountered. These problems can be corrected by forming a barrier similar to that described above, except that the barrier has no permeability or very low permeability to fluid flow. A strong, durable impermeable barrier can be provided by use of the resin emulsion injection step described above, by omitting the step of injecting the brine into the resin which has been injected into the formation. A very small amount of brine or other fluid should be pumped down the well tubing to ensure that the resin-containing fluid is removed therefrom, but the volume of fluid should be carefully controlled to ensure that none of the salt water fluid enters the formation. The composition and quantity of the resin fluid is precisely the same as is described above for sand consolidation use. The well should be shut in for from 1 to 10 days to allow the resin time to polymerize completely prior to resumption of oil production.

EXPERIMENTAL

The following laboratory tests were performed and the results are given below:

A first preliminary test was performed using a simple laboratory hypodermic syringe for the purpose of demonstrating that consolidation can be achieved using our procedure. A supply of unconsolidated sand from an actual oil formation in the Kern River field in California was obtained and this was used in all of the test described herein. A fluid was prepared comprising 40% resin, 59% butylacetate and 1% orthonitrobenzoic acid (the acid was first dissolved in the butylacetate prior to mixing with the resin.) The numbers given represent volume mixing ratios based on the resin in its commercial form. This single fluid was then injected into a sample of Kern River formation, after which saturated salt (NaCl) water was injected to displace excess resin fluid from the pore spaces of the resin treated sand pack. This sample was then placed in an oven at 200° F. for one week and the material was tested. It was found that the formation sand had been consolidated and was quite strong, and that it was quite permeable, sufficient to permit passage of crude oil or other fluids through the consolidated sand mass.

A larger scale experiment was performed using a laboratory cell that measured approximately 5 inches in diameter and 14 inches in height. The cell was packed with the same Kern River Field formation sample utilized previously. Kern River crude oil was then injected into the material to represent the situation that would be encountered in a freshly drilled portion of oil containing formation. A fluid comprising the same resin, ester and catalyst as is described above was then injected into the cell, after which saturated sodium chloride brine was injected slowly to displace the excess resin material from the pore space. The volume of this cell was approximately 18 liters and about 1.5 liters of Kern River crude oil was injected prior to the sand consolidation test. Six liters of the resin fluid was utilized in the treatment process and approximately six liters of saturated sodium chloride brine was utilized in the second injection step. The material was then placed in an oven at 200° F. for 5 days. After the cell was removed from the oven and cooled, it was examined carefully and found to be thoroughly consolidated. The consolidating matrix was uniform in appearance and quite strong, and yet the mass still retained sufficient permeability to permit free flow of fluids including crude oil through the consolidated sand mass material.

For the purpose of complete disclosure, including what is now believed to be as the best mode for applying the process of our invention, the following pilot field example is supplied.

A producing well is completed in a subterranean petroleum containing formation, the formation being from 8540 to 8588 feet. Considerable sand production has been experienced in other wells completed in this formation in the past, and so it is contemplated that some treatment must be applied in order to permit oil production from this formation without experiencing the various problems of unconsolidated sand production. This particular well has not been used for oil production, and so little sand has been produced from the formation. It is known that the sand is coated with formation crude, but is otherwise of a reasonable particle size to accommodate sand consolidation process using the natural sand present in the formation. It is decided therefore to inject sand control fluid into the formation immediately adjacent to the perforation of the producing well in order to bind the naturally occurring sand grains together and form a stable mass which forms a permeable barrier to restrain the flow of formation sand into the well while still permitting the free flow of formation fluids including petroleum through the barrier. It is determined that it is sufficient to treat approximately 12 inches into the formation. Based on experience in this field, it is expected that the porosity of the formation to be treated is approximately 40%. The outside casing diameter of the well being treated is ten inches. The volume of fluid necessary to treat this portion of formation is determined as follows:

$$\frac{3.14\left(\frac{10}{2} + 12\right)^2 - 3.14\left(\frac{10}{2}\right)^2}{144} \times (0.40)(48) =$$

$$\frac{3.14(17)^2 - 3.14(5)^2}{144} \times (.40)(48) =$$

110.58 Cu. Ft. or 827.3 gallons

In order to accomplish adequate saturation of the portion of the unconsolidated sand formation adjacent to the production well, a total of 827 gallons of resin treating fluid is required. The resin employing this procedure is QO-1300 obtained from QO Chemicals, which is an oligomer of furfuryl alcohol. The 827 gallons of sand consolidation treating fluid is formulated by mixing 330 gallons of the above described resin with 487 gallons of butylacetate to which had previously been added 8 gallons of nitrobenzoic acid. The resin solution is prepared by first dissolving the ester in nitrobenzoic acid and then mixing resin with this fluid mixture of ester and acid. This fluid is injected into the formation at a rate of about 900 gallons per hour. After all of the treating fluid has been injected into the formation, 827 gallons of saturated sodium chloride brine is formulated and injected into the well at the same rate to displace the treating fluid out of the injection string and to force brine through the portion of the formation into which the treating fluid has been injected, displacing a portion of the treating fluid from the void spaces in the formation thereby forming flow channels in the resin zone. This ensures that the residual permeable barrier will exhibit sufficient permeability to permit production of fluids from the well. The well is shut in and is left for a period of 8 days, which is considered adequate for this particular instance in which the formation temperature is 225° F. At the conclusion of this shut-in soak period, the well is placed on production and essentially sand-free oil production is obtained.

Although our invention has been described in terms of a series of specific preferred embodiments and illustrative examples which applicants believe to include the best mode for applying their invention known to them at the time of this application, it will be recognized to those skilled in the art that various modifications may be made to the composition and methods described herein without departing from the true spirit and scope of our invention which is defined more precisely in the claims appended hereinafter below.

We claim:

1. A method for consolidating unconsolidated mineral particles including sand in a subterranean petroleum formation penetrated by a well in fluid communication with at least a portion of the formation, comprising:
   (a) providing a fluid comprising a polymerizable resin, a polar organic diluent for the resin, and an oil soluble acid catalyst capable of causing polymerization of the resin at formation temperatures comprising orthonitrobenzoic acid;

(b) injecting said fluid into the formation to saturate at least a portion of the formation adjacent to the well;

(c) providing an aqueous fluid comprising water containing selected inorganic salts including sodium chloride in a concentration at least 70% of saturation of said inorganic salts at surface ambient temperature;

(d) injecting the salt containing aqueous solution into the same portion of the formation contacted by the resin containing fluid; and (e) allowing the injected fluids to remain in the formations for a period of time sufficient to accomplish at least partial polymerization of the resin, forming a permeable consolidated mass around the wellbore.

2. A method recited in claim 1 wherein the resin is oligomer of furfuryl alcohol.

3. A method as recited in claim 2 wherein the concentration of the furfuryl alcohol oligomer is from 40 to 60% by volume based on the total volume of the fluid.

4. A method as recited in claim 2 wherein the concentration of furfuryl alcohol oligomer is from 2 to 6% by volume based on the total volume of the fluid.

5. A method as recited in claim 1 wherein the polar organic diluent is a hydrolyzable ester.

6. A method as recited in claim 5 wherein the polar organic diluent is butylacetate.

7. A method as recited in claim 6 wherein the concentration of butylacetate in the treating fluid is from 40 to 60% by volume.

8. A method as recited in claim 6 wherein the concentration of butylacetate in the treating fluid is from 45 to 55% by volume.

9. A method as recited in claim 8 wherein the concentration of catalyst is from 0.8 to 1.2% by volume.

10. A method as recited in claim 1 wherein the concentration of catalyst is from 0.8 to 2% by volume.

11. A method as recited in claim 1 wherein the salt containing aqueous fluid is at least 80% saturated with respect to said inorganic salt at surface ambient temperatures.

12. A method as recited in claim 1 wherein the aqueous fluid is essentially saturated with respect to said inorganic salt.

13. A method as recited in claim 1 wherein the aqueous fluid is a sodium chloride brine.

14. A method as recited in claim 13 wherein the sodium chloride brine is at least 70% saturated.

15. A method as recited in claim 13 wherein the aqueous fluid is saturated sodium chloride brine.

16. A method as recited in claim 1 wherein the resin-containing fluid is prepared by dissolving catalyst in the polar organic diluent and then mixing with the resin.

17. A method as recited in claim 1 wherein the volume of consolidating treating fluid injected into the formation is sufficient to saturate the pore space of the formation adjacent to the producing well for a distance up to 12 inches from the well.

18. A method as recited in claim 1 wherein the volume of consolidating treating fluid injected into the formation is sufficient to saturate the pore space of the formation adjacent to the producing well for a distance up to 8 inches from the well.

19. A method as recited in claim 1 wherein the volume of aqueous fluid injected into the formation after injecting the consolidating treating fluid is about equal to the volume of treating fluid used.

20. A method as recited in claim 1 wherein the fluids are left in the formation for a period of at least 3 days.

* * * * *